(12) United States Patent
Kershaw

(10) Patent No.: US 6,182,615 B1
(45) Date of Patent: Feb. 6, 2001

(54) COMBUSTION-DRIVEN HYDROELECTRIC GENERATING SYSTEM

(76) Inventor: Charles H. Kershaw, P.O. Box 87133, Houston, TX (US) 77287

( * ) Notice: Under 35 U.S.C. 154(b), the term of this patent shall be extended for 0 days.

(21) Appl. No.: 09/272,143

(22) Filed: Mar. 19, 1999

(51) Int. Cl.[7] .............................. F02B 75/00; F04B 35/02
(52) U.S. Cl. .............................. 123/19; 417/379; 290/54
(58) Field of Search .............................. 123/19; 417/379, 417/381; 60/325, 326, 398; 290/52, 54

(56) References Cited

U.S. PATENT DOCUMENTS

| | | | |
|---|---|---|---|
| 3,611,723 | * 10/1971 | Theis, Jr. | 60/51 |
| 3,815,555 | * 6/1974 | Tubeuf | 123/19 |
| 3,995,428 | * 12/1976 | Roberts | 60/641.2 |
| 3,998,049 | * 12/1976 | McKinley et al. | 60/39.55 |
| 4,201,049 | * 5/1980 | Tobber | 60/325 |
| 5,127,369 | * 7/1992 | Goldshtik | 123/19 |
| 5,192,355 | * 3/1993 | Eastin | 71/54 |
| 5,461,858 | * 10/1995 | Johnson | 60/325 |
| 5,488,828 | * 2/1996 | Brossard | 60/675 |
| 5,551,237 | * 9/1996 | Johnson | 60/641.8 |
| 5,713,202 | * 2/1998 | Johnson | 60/325 |

* cited by examiner

Primary Examiner—Andrew M. Dolinar
Assistant Examiner—Hia Huynh
(74) Attorney, Agent, or Firm—Kenneth A. Roddy

(57) ABSTRACT

A combustion-driven hydroelectric generating system has one or more combustion cylinders that contain a liquid (such as water) and receive a combustible fuel/oxidizer mixture that is ignited and the explosive force of the combustion acts on the surface of the liquid to transfer a metered slug of the liquid to a pressurized vessel containing a pressurized gas (preferably an inert gas). The pressurized liquid from the pressurized vessel serves as a "head of water" that can be used to operate a water wheel (Pelton wheel) or hydroelectric generator and perform other useful work. The transferred liquid is replaced in the combustion cylinder, another charge of the fuel/oxidizer is introduced and ignited and the process is repeated.

18 Claims, 1 Drawing Sheet

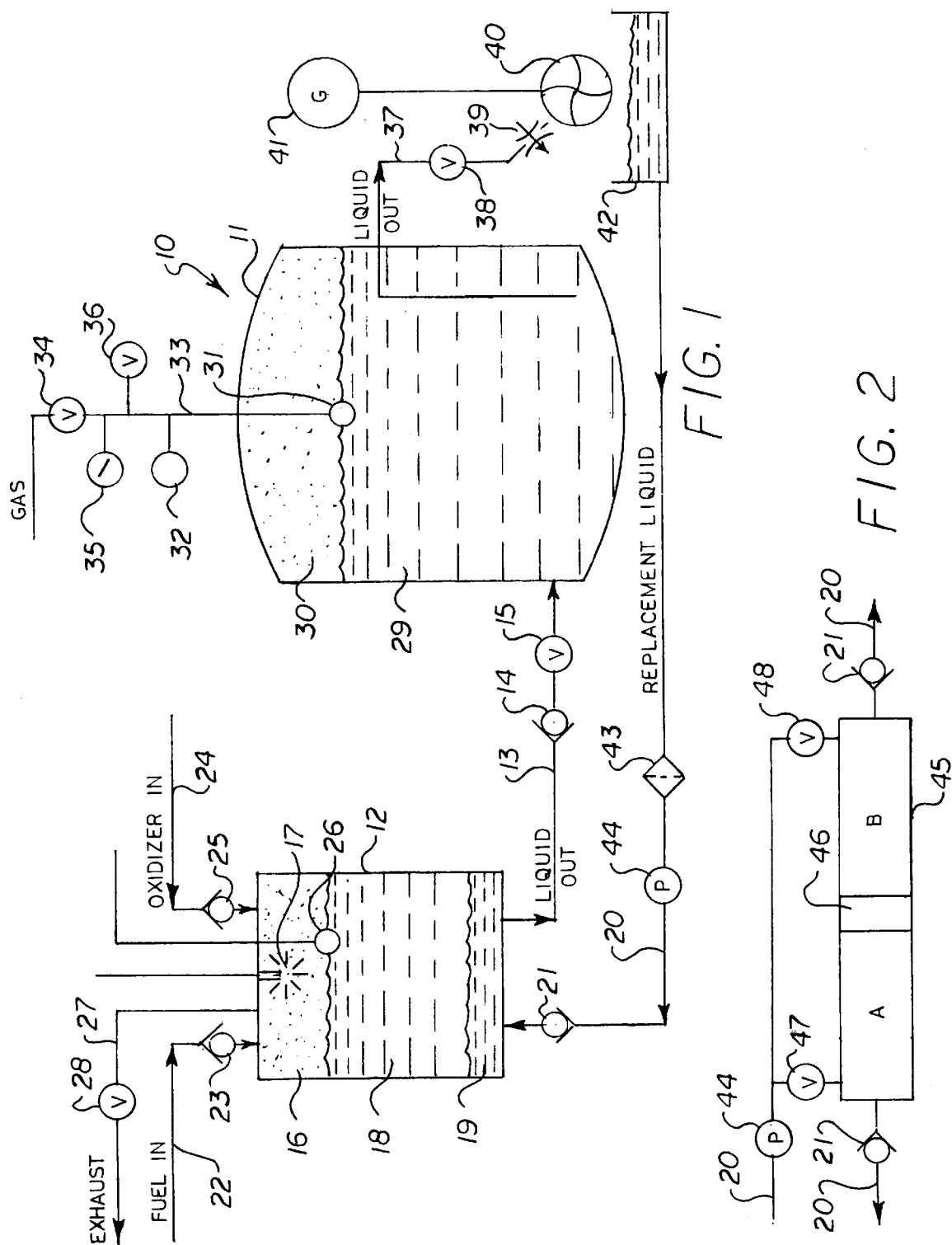

COMBUSTION-DRIVEN HYDROELECTRIC GENERATING SYSTEM

BACKGROUND OF THE INVENTION

1. Field of the Invention

This invention relates generally to the production of hydroelectric power, and more particularly to a combustion-driven hydroelectric generating system wherein a combustible fuel mixture is introduced and ignited in one or more combustion cylinders containing a liquid and the force of the combustion acts on the surface of the liquid to transfer a slug of the liquid to a gas pressurized vessel and the pressurized liquid from the vessel is used to operate a hydroelectric generator and perform other useful work.

2. Brief Description of the Prior Art

Electrical generation companies normally operate on a power grid system, wherein numerous individual power plants of the fossil fuel type, nuclear type, or the like are joined together over common transmitting lines. The electricity is usually generated using rotating generating equipment. Most electrical power generating facilities in the United States, at the present time, utilize a gas turbine generator as a prime power source for generating electricity that operates on a combustible fuel, usually natural gas, but some employ gas obtained by coal gassification or liquid fuel in vapor form.

Another frequently employed means for generating electricity is a hydraulic turbine generator utilizing the energy of the head of an elevated supply of water. Commonly, the electrical generation and distribution industry also utilizes pump-back facilities which store energy in the form of water head, utilizing energy during the periods when it is most readily and economically available and when surplus generating capacity exists, and recovering the energy to meet peak load demands. Typically, these pumpback facilities use electrical power to drive a generator which, when energized, functions as an electric motor, to power the turbines which, when driven, function as a pump, to move water from a lower elevation through a penstock to an upper elevation, usually an elevated lake. When the flow of water is reversed, the turbine drives the generator to recover the energy. A substantial amount of energy is required to move the water to the upper location and thus the recovered energy is always less than the amount of energy required to move the water to the upper elevation.

The present invention produces and stores energy in the form of pressurized water that is used as a head of water to operate a hydroelectric power generating apparatus without having to move the water to an upper location and is not dependent upon being located near a lake or reservoir.

The present invention is distinguished over the prior art by a combustion-driven hydroelectric generating system that utilizes one or more combustion cylinders that contain a liquid (such as water) and receive a combustible fuel/oxidizer mixture that is ignited and the explosive force of the combustion acts on the surface of the liquid to transfer a metered slug of the liquid to a pressurized vessel containing a pressurized gas (preferably an inert gas). The pressurized liquid from the pressurized vessel serves as a "head of water" that can be used to operate a water wheel (Pelton wheel) or hydroelectric generator and perform other useful work. The transferred liquid is replaced in the combustion cylinder, another charge of the fuel/oxidizer is introduced and ignited and the process is repeated.

SUMMARY OF THE INVENTION

It is therefore an object of the present invention to provide a combustion-driven hydroelectric generating system that utilizes readily available fuel and liquid products to produce hydroelectric power inexpensively.

It is another object of this invention to provide a combustion-driven hydroelectric generating system for use as an emergency power supply to provide hydroelectric power during power outages and when existing power sources are unavailable.

Another object of this invention is to provide a combustion-driven hydroelectric generating system having fuel and pressure requirements that can be served from existing plant or domestic drops from natural gas pipelines.

Another object of this invention is to provide a combustion-driven hydroelectric generating system that produces and stores energy in the form of pressurized water that is used as a head of water to operate a hydroelectric power generating apparatus without having to move the water to an upper location and is not dependent upon being located near a lake or reservoir.

Another object of this invention is to provide a combustion-driven hydroelectric generating system that is suitable for individual domestic residential use and for large-scale commercial use to provide hydroelectric power.

Another object of this invention is to provide a combustion-driven hydroelectric generating system that is non-polluting when operating on natural gas.

Another object of this invention is to provide a combustion-driven hydroelectric generating system that does not require a muffler and has low-noise emission.

A further object of this invention is to provide a combustion-driven hydroelectric generating system that has a minimum of moving parts and is reliable in operation.

A still further object of this invention is to provide a combustion-driven hydroelectric generating system that is inexpensive to manufacture, operate, and maintain.

Other objects of the invention will become apparent from time to time throughout the specification and claims as hereinafter related.

The above noted objects and other objects of the invention are accomplished by a combustion-driven hydroelectric generating system that has one or more combustion cylinders that contain a liquid (such as water) and receive a combustible fuel/oxidizer mixture that is ignited and the explosive force of the combustion acts on the surface of the liquid to transfer a metered slug of the liquid to a pressurized vessel containing a pressurized gas (preferably an inert gas). The pressurized liquid from the pressurized vessel serves as a "head of water" that can be used to operate a water wheel (Pelton wheel) or hydroelectric generator and perform other useful work. The transferred liquid is replaced in the combustion cylinder, another charge of the fuel/oxidizer is introduced and ignited and the process is repeated.

BRIEF DESCRIPTION OF THE DRAWINGS

FIG. 1 is a schematic diagram of the combustion-driven hydroelectric generating system in accordance with the present invention.

FIG. 2 is a schematic diagram showing a piston cylinder that may be connected with the hydroelectric generating system to produce useful work.

DESCRIPTION OF THE PREFERRED EMBODIMENT

In a basic form, the combustion-driven hydroelectric generating system comprises one or more combustion cylinders that contain a liquid (such as water) and receive a combustible fuel/oxidizer mixture that is ignited and the explosive force of the combustion acts on the surface of the liquid to transfer a metered slug of the liquid to a pressurized vessel containing a pressurized gas (preferably an inert gas such as nitrogen or argon). The products of combustion in the combustion cylinders are vented to the atmosphere either directly or via thermal and/or pressure scavengers. The pressurized liquid from the pressurized vessel serves as a "head of water" that can be used to operate a water wheel (Pelton wheel) or hydroelectric generator and perform other useful work. The transferred liquid is replaced in the combustion cylinder, another charge of the fuel/oxidizer is introduced and ignited and the process is repeated.

Referring to the drawings by numerals of reference, there is shown schematically in FIG. 1, a preferred combustion-driven hydroelectric generating system 10. A pressure vessel 11 is connected to one or more combustion cylinders 12 by a liquid supply line 13 that conducts a high-pressure liquid from the combustion cylinder 12 to the vessel 11 though a series connected check valve 14 and shut-off valve 15. There may be any number of combustion cylinders 12 feeding the vessel 11, such as via a plenum or manifold so that one may be filling while another is firing. For safety, a maximum temperature may be assigned to each combustion cylinder 12.

Each combustion cylinder 12 has an upper section 16 that holds a combustible charge of a fuel/oxidizer mixture and is equipped with a firing apparatus 17, such as a spark plug, glow plug, or other suitable igniter. A battery and contacter or other suitable source (not shown) may accomplish ignition of the firing apparatus 17. An intermediate section 18 of the combustion cylinder 12 holds a volume of liquid that is to be passed to the vessel 11 under pressure exceeding the pressure in the vessel during combustion. The lower section 19 holds the liquid that is remaining after the shot or combustion. Replacement liquid is introduced into the lower end of the combustion cylinder 12 via line 20 and check valve 21, as described hereinafter.

A suitable fuel, such as a combustible gas (preferably natural gas), and a suitable oxidizer, such as air may be introduced separately into the combustion cylinder 12 via fuel line 22 and check valve 23, and oxidizer line 24 and check valve 25, respectively, and mixed inside the cylinder. Alternatively, the fuel and oxidizer may be mixed outside the cylinder and introduced as a mixture.

A liquid level sensor 26 senses the liquid level in the upper section 16 and, at a different cycle time, the liquid level in lower section 19, or there may be separate sensors for each level. By use of a computer or microcontroller, these level signals maintain the maximum slug of high-pressure liquid and prevent transferring products of combustion to the upper section of the pressurized vessel 11.

The products of combustion, after firing, are released from the combustion cylinder 12 through exhaust line 27 and exhaust valve 28. Additional apparatus such as thermal and/or pressure scavengers may be connected with the exhaust line 27 to recover excess heat and pressure. Since some fuel, air or products of combustion may dissolve in the high pressure liquid slug and become transferred to the vessel 11, a processing loop may be used to remove those gases. A suitable membrane may also be disposed in the combustion cylinder 12 at the interface between the fuel/oxidizer mixture and the liquid to prevent products of combustion from becoming mixed with the liquid.

The pressurized vessel 11 contains a volume of the liquid in a lower section 29, and a compressed gas, preferably an inert gas such as nitrogen or argon, is contained in an upper section 30 above the liquid. If the liquid is devoid of products of combustion, compressed air may be used. The interface between the gas and liquid is sensed by a liquid level transducer 31, and is maintained between maximum and minimum levels by computer control (not shown). The pressure in the vessel 11 is sensed by a pressure transducer 32, which is used to maintain a constant pressure in the vessel, for example 150 PSI. The inert gas is introduced into the vessel 11 through a manifold 33 equipped with a manual gas filling valve 34, a pressure gauge 35, and a safety relief valve 36. The liquid level transducer 31 may also be connected with the manifold 33. A suitable membrane may be disposed in the pressurized vessel 11 at the interface between the gas and the liquid to prevent gases from becoming mixed with the liquid.

The liquid from the pressurized vessel 11 is conducted via a working line 37 equipped with a shut-off valve 38 and a throttle valve 39 which conducts the high-pressure liquid to a hydroelectric water wheel 40 (Pelton wheel) and generator 41.

Replacement liquid after passing over the water wheel 40 is collected in a catchment trough 42 and conducted via replacement liquid line 20 through a filter 43 and is pumped by pump 44 into the lower section of the combustion cylinder 12 through check valve 21. Optionally, flow and pressure transducers (not shown) may monitor the replacement liquid. A liquid make-up apparatus may be used at the catchment trough 42 to off-set the normal loss of liquid to the atmosphere if the system is operated as a closed liquid cycle but not a closed air cycle.

In a preferred embodiment, a computer or microcontroller (not shown) is used to control the timing of firing cycles, the volume of, and pressure applied to, each liquid slug, the fuel mixture/liquid interface levels in the combustion cylinders 12 and the pressurized gas/liquid interface levels in the pressurized vessel 11 such that the electric generator or other end use of the liquid's energy is maintained at predetermined speed and power levels. This function is also facilitated by the throttle valve 39. The computer or microcontroller also meters the appropriate combustion mixture and make-up (replacement) liquid.

The firing cycle of the combustion cylinder 12 is as follows. The combustion cylinder 12 is loaded with a metered liquid charge, as described above, at one atmosphere. A metered amount of the combustible fuel/oxidizer mixture at the appropriate pressures is introduced into the upper section 16 of the combustion cylinder 12. The igniter 17 is fired, and the pressure in the combustion cylinder 12 rises rapidly to a peak, as does the temperature. Then both drop less rapidly to the pressure and equilibrium temperature of the pressurized vessel 11. Finally, the remaining combustion cylinder pressure drops below the pressure of the pressurized vessel 11 due to further cooling of the remaining products of combustion.

The explosive force in the combustion cylinder 12 during combustion acts on the surface of the liquid to transfer a metered slug of the liquid to the pressurized vessel 11 containing the pressurized gas. The products of combustion in the combustion cylinder 12 are vented to the atmosphere. The pressurized liquid from the pressurized vessel 11 is used as a "head of water" that can operate a water wheel (Pelton wheel) and/or hydroelectric generator to perform useful work. The transferred liquid is replaced in the combustion cylinder 12, another charge of the fuel/oxidizer mixture is introduced and ignited and the process is repeated.

FIG. 2 shows a free or coupled piston cylinder 45 that can be used to perform a number of optional services when there are multiple combustion cylinders 12. For example, left and right chambers A and B divided by a moving piston 46, in turn, can be filled through computer controlled valves 47 and 48 with the metered liquid slug at a slow pace between firings, then pushed rapidly into the appropriate combustion cylinder to decrease the cycle time. Motive force for the operation of the piston 46 may be supplied directly from a take-off shaft connected with the water wheel 40 or by utilizing the exhaust pressure of a prior cycle. Similarly, another piston and cylinder or even the same piston and cylinder may supply the fuel/oxidizer required by the combustion cylinders.

Existing drops from natural gas pipelines, plant or domestic can adequately serve the pressure and volume requirements of the present system. The full power rating is available within seconds of a "grid" power failure, as distinct from the extended crank-up time on current emergency power supplies, and it is particularly suited for emergency electrical supply, for overloaded and escalating costs in black-out and brown-out conditions on the "grid", and for economic, peak hours feed-back to the grid.

The system is very quiet, relatively efficient and low polluting as compared to gasoline and diesel systems, and is capable of supplying non-propulsive loads in road vehicles, ships and military applications.

While this invention has been described fully and completely with special emphasis upon preferred embodiments, it should be understood that within the scope of the appended claims the invention may be practiced otherwise than as specifically described herein.

What is claimed is:

1. A process for generating hydroelectric power comprising the steps of:

providing first and second combustion cylinders each containing a volume of liquid, a pressurized vessel containing a volume of gas under pressure connected with each combustion cylinder through one-way valve means to allow fluid flow from said first and second combustion cylinders into the pressurized vessel in alternating cycles, hydroelectric power generation means connected with said first and second combustion cylinders, liquid replacement means connected with said pressurized vessel and said hydroelectric power generation means, liquid replacement means connected with said hydroelectric power generation means and said first and second combustion cylinders, and a fluid transfer cylinder connected between said liquid replacement means and said first and second combustion cylinders;

said fluid transfer cylinder having first and second chambers divided by a movable piston and each chamber having a liquid outlet connected with respective said first and second combustion cylinders and a liquid inlet connected with said liquid replacement means through metering valve means for alternately filling said first and second chambers with liquid at a first rate between combustion cycles of one of said first and second combustion cylinders and discharging liquid into the other one of said first and second combustion cylinders at a greater rate to increase the rate at which liquid is conducted into said first and second combustion cylinders;

alternately introducing a combustible fuel mixture into said first and second combustion cylinders above the volume of liquid and combusting the fuel mixture to forcefully transfer a portion of the volume of liquid from said first and second combustion cylinders into the pressurized vessel in alternating cycles, wherein the liquid contained therein is pressurized at a predetermined pressure;

conducting a portion of the pressurized liquid from the pressurized vessel to a hydroelectric power generation apparatus for operating the hydroelectric apparatus to generate power; and conducting a portion of the liquid used to operate said hydroelectric power generation apparatus through said liquid transfer cylinder and alternately filling its said first and second chambers with liquid at a first rate between combustion cycles of one of said first and second combustion cylinders and discharging liquid into the other one of said first and second combustion cylinders at a greater rate to rapidly replace the portion of liquid that was transferred from said first and second combustion cylinders.

2. The process according to claim 1, wherein the liquid is water.

3. The process according to claim 1, wherein the gas contained in the pressurized vessel is an inert gas.

4. The process according to claim 3, wherein the inert gas contained in the pressurized vessel is selected from the group consisting of nitrogen, argon, and air.

5. The process according to claim 1, wherein said combustible fuel mixture is a mixture selected from the group consisting of a mixture of natural gas and air, and a mixture of hydrocarbon fuel and air.

6. The process according to claim 1, wherein the hydroelectric power generation apparatus comprises a Pelton wheel for generating electricity.

7. The apparatus according to claim 1, wherein said hydroelectric power generation means comprises a Pelton wheel for generating electricity.

8. The process according to claim 1, including the steps of utilizing the exhaust pressure of said first and second combustion cylinders to move said fluid transfer cylinder movable piston during respective exhaust cycles to alternately fill said first and second chambers with liquid at a first rate during exhaust cycles of one of said first and second combustion cylinders and discharge liquid into the other one of said first and second combustion cylinders at a greater rate to increase the rate at which liquid is conducted into said first and second combustion cylinders.

9. The process according to claim 1, including the step of connecting said fluid transfer cylinder movable piston with said hydroelectric power generation means through power take off means and moving said piston to alternately fill said first and second chambers with liquid at a first rate and discharge liquid into the other one of said first and second combustion cylinders at a greater rate to increase the rate at which liquid is conducted into said first and second combustion cylinders.

10. Apparatus for generating hydroelectric power, comprising:

a first and second combustion cylinder for containing a volume of liquid each having a liquid inlet for receiving a liquid, a fuel mixture inlet for receiving a combustible fuel mixture, fuel ignition means, an exhaust outlet for exhausting products of combustion, and a liquid discharge outlet for discharging liquid therefrom;

a pressurized vessel for containing a volume of gas under pressure having a gas inlet for receiving a volume of gas, a liquid inlet connected in fluid communication with said first and second combustion cylinder liquid discharge outlets through one-way valve means to allow fluid flow from said first and second combustion cylinder into said vessel in alternating cycles, and a liquid outlet;

hydroelectric power generation means operatively connected with said pressurized vessel liquid outlet for receiving liquid from said vessel and generating power responsive thereto;

liquid replacement means for receiving a portion of the liquid from said hydroelectric power generation means including one-way valve means, pump means and conduit means connected with each said combustion cylinder liquid inlet for conducting a portion of the liquid from said hydroelectric power generation means back into each said combustion cylinder; and a fluid transfer cylinder having first and second chambers divided by a movable piston and each chamber having a liquid outlet connected with a respective liquid inlet of said first and second combustion cylinders and a liquid inlet connected with said liquid replacement means through metering valve means for alternately filling said first and second chambers with liquid at a first rate between combustion cycles of one of said first and second combustion cylinders and discharging liquid into the other one of said first and second combustion cylinders at a greater rate to increase the rate at which liquid is conducted into said first and second combustion cylinders; wherein a volume of gas is introduced into said pressurized vessel, a combustible fuel mixture is alternately introduced into said first and second combustion cylinders above a volume of liquid contained therein, said ignition means is activated to combust the fuel mixture to forcefully transfer a portion of the volume of liquid through said one-way valve means into said pressurized vessel and the products of combustion are exhausted from said first and second combustion cylinders in alternating cycles;

the liquid transferred to said pressurized vessel is pressurized by said gas therein, and a portion of the pressurized liquid is conducted from said vessel to said hydroelectric power generation means for operating the same to generate power; and a portion of the liquid used to operate said hydroelectric power generation means is conducted by said liquid replacement means and said liquid transfer cylinder back into one of said combustion cylinders to rapidly replace the portion of liquid transferred therefrom while a fuel mixture is introduced and combusted the other one of said combustion cylinders.

11. The apparatus according to claim 10, wherein said liquid is water.

12. The apparatus according to claim 10, wherein said gas contained in said pressurized vessel is an inert gas.

13. The apparatus according to claim 12, wherein said inert gas is comprised of the group consisting of nitrogen, argon, and air.

14. The apparatus according to claim 10, wherein said combustible fuel mixture is a mixture selected from the group consisting of a mixture of natural gas and air, and a mixture of hydrocarbon fuel and air.

15. The apparatus according to claim 10, wherein said fluid transfer cylinder movable piston is operatively connected with said exhaust outlet of said first and second combustion cylinders to be moved by exhaust pressure during respective exhaust cycles to alternately fill said first and second chambers with liquid at a first rate during exhaust cycles of one of said first and second combustion cylinders and discharge liquid into the other one of said first and second combustion cylinders at a greater rate to increase the rate at which liquid is conducted into said first and second combustion cylinders.

16. The apparatus according to claim 10, wherein said fluid transfer cylinder movable piston is operatively connected with said hydroelectric power generation means through power take off means to be moved thereby to alternately fill said first and second chambers with liquid at a first rate and discharge liquid into the other one of said first and second combustion cylinders at a greater rate to increase the rate at which liquid is conducted into said first and second combustion cylinders.

17. A system for producing a head of liquid at under pressure at different rates to be used for performing useful work, comprising:

first and second combustion cylinders for containing a volume of liquid each having a liquid inlet for receiving a liquid, a fuel mixture inlet for receiving a combustible fuel mixture, fuel ignition means, an exhaust outlet for exhausting products of combustion, and a liquid discharge outlet for discharging liquid therefrom;

a pressurized vessel for containing a volume of gas under pressure having a gas inlet for receiving a volume of gas, a liquid inlet connected in fluid communication with said first and second combustion cylinder liquid discharge outlets through one-way valve means to allow fluid flow from said first and second combustion cylinders into said vessel in alternating cycles, and a liquid outlet; and a fluid transfer cylinder having first and second chambers divided by a movable piston and each chamber having a liquid outlet connected with a respective liquid inlet of said first and second combustion cylinders and a liquid inlet connected with a source of replacement liquid through metering valve means for alternately filling said first and second chambers with liquid at a first rate between combustion cycles of one of said first and second combustion cylinders and discharging liquid into the other one of said first and second combustion cylinders at a greater rate to increase the rate at which liquid is conducted into said first and second combustion cylinders; wherein a volume of gas is introduced into said pressurized vessel, a combustible fuel mixture is alternately introduced into said first and second combustion cylinders above a volume of liquid contained therein, said ignition means is activated to combust the fuel mixture to forcefully transfer a portion of the volume of liquid through said one-way valve means into said pressurized vessel and the products of combustion are exhausted from said first and second combustion cylinders in alternating cycles;

the liquid transferred to said pressurized vessel is pressurized by said gas therein, and a portion of the pressurized liquid is conducted from said vessel to performing useful work; and p1 a portion of the liquid used to perform useful work is utilized as replacement liquid and conducted by said liquid transfer cylinder back into one of said combustion cylinders to rapidly replace the portion of liquid transferred therefrom while a fuel mixture is introduced and combusted the other one of said combustion cylinders.

18. The system according to claim 17, wherein
said fluid transfer cylinder movable piston is operatively connected with said exhaust outlet of said first and second combustion cylinders to be moved by exhaust pressure during respective exhaust cycles to alternately fill said first and second chambers with liquid at a first rate during exhaust cycles of one of said first and second combustion cylinders and discharge liquid into the other one of said first and second combustion cylinders at a greater rate to increase the rate at which liquid is conducted into said first and second combustion cylinders.

* * * * *